Patented Feb. 2, 1954

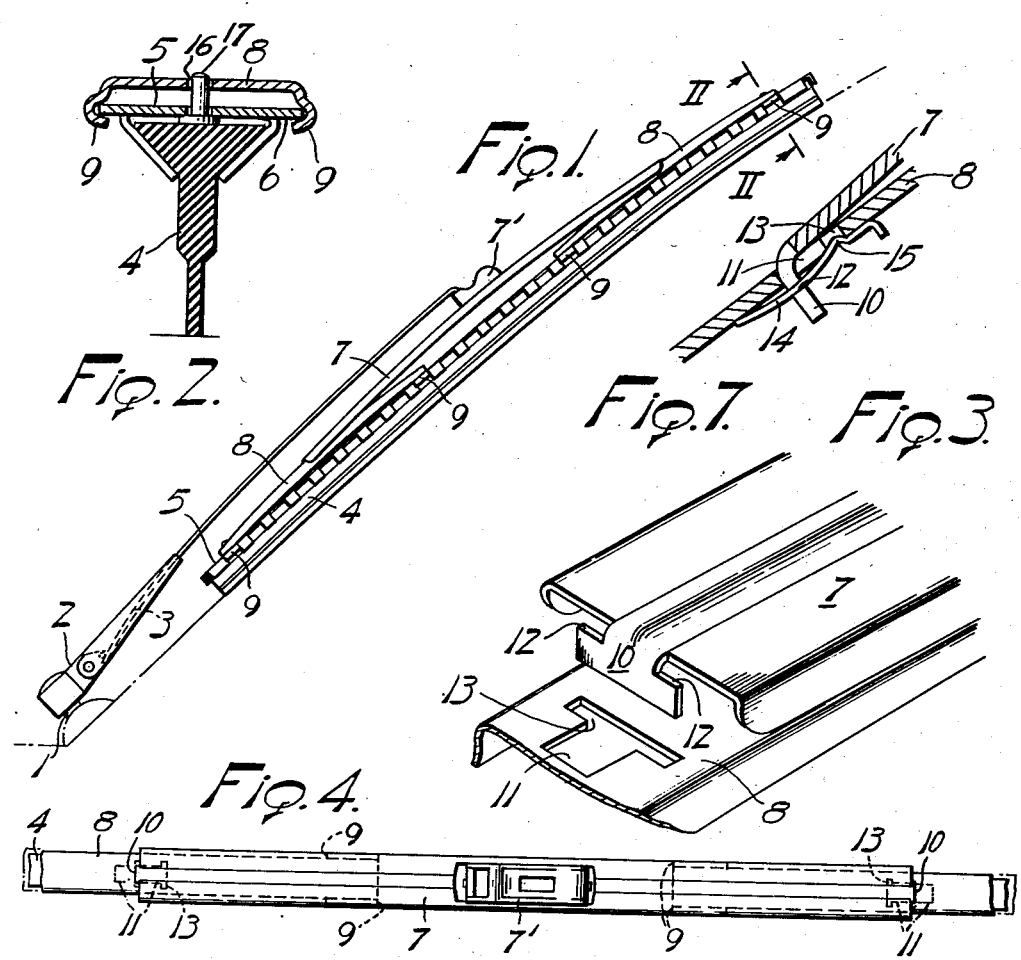
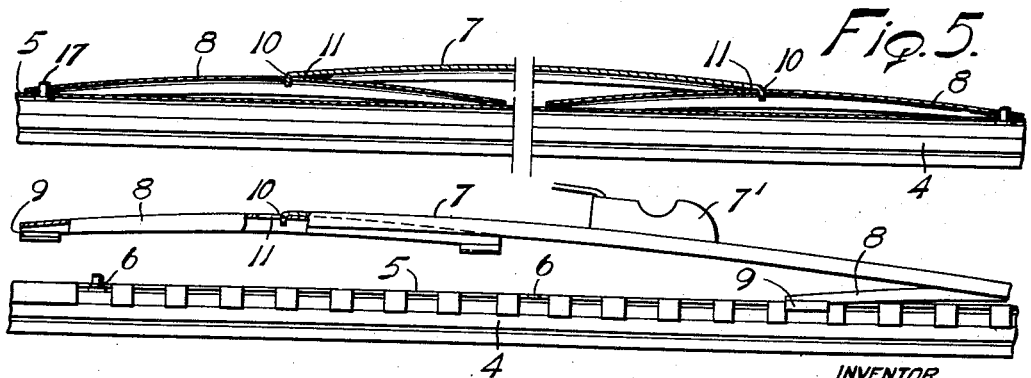

2,667,656

UNITED STATES PATENT OFFICE 2,667,656

WINDSHIELD WIPER

John R. Oishei, Buffalo, N. Y., assignor to Trico Products Corporation, Buffalo, N. Y.

Application October 28, 1949, Serial No. 124,102

7 Claims. (Cl. 15—245)

This invention is in the windshield cleaning field and is more particularly on the wiper or blade part of a windshield cleaner mechanism. A wiper of recent origin has employed a superstructure of triple yoke design by which the arm-applied pressure was distributed to the wiping edge at longitudinally spaced points. The several yokes were interconnected to the wiper body in a flexible manner that necessitated special operations which added to the cost of production.

The object of this invention is to simplify the construction of the wiper toward economy in production.

Again the invention has for its object to provide an improved wiper structure which provides for the more effective application of the arm pressure and a more efficient cleaning performance.

The foregoing and other objects will manifest themselves as this description progresses, reference being made therein to the accompanying drawing, wherein Fig. 1 is a side elevation of the improved wiper in its operative position on a windshield;

Fig. 2 is a transverse section thereof, as viewed about on line 2—2 of Fig. 1, depicting one interlock and its securing means;

Fig. 3 is a fragmentary perspective view of the second interlock with the parts separated;

Fig. 4 is a plan or back view of the wiper;

Fig. 5 is a fragmentary longitudinal sectional view of the wiper;

Fig. 6 is a side elevation of the blade partially assembled and with parts broken away; and Fig. 7 is a fragmentary sectional view of the modified form of the second interlock.

Referring more particularly to the accompanying drawing, the numeral 1 designates the drive shaft for the windshield cleaner, 2 the wiper carrying arm having its well known pressure applying spring 3, and 4 the wiper body which has a flexible backing 5, of metal or the like, provided with longitudinally spaced sets of oppositely projecting tongues 6 extending laterally therefrom and to which the pressure distributing superstructure is connected.

The superstructure or frame employed for distributing the arm spring pressure to the wiper throughout its length comprises a primary yoke 7 and plural secondary yokes 8 all pivotally interconnected, with the opposite ends of the secondary yokes having oppositely facing grooves or seats 9 for slidably receiving the tongues 6. The primary yoke is connected to the outer end of the arm 2, as by a clip 7', and has its opposite ends interlocked to the secondary yokes intermediate their ends. This interlock is preferably designed to be established concurrently with the engagement of the tongues 6 in their straddling seats 9. To this end the interlocking parts may, as depicted clearly in Fig. 3, comprise a headed stud 10 on one yoke and a recess 11 on the cooperating yoke. The stud 10 may be substantially T-shaped to provide shoulders 12, while the recess 11 may be in the form of a T-shaped slot to provide an entranceway 13 for enabling the engagement of the headed stud in the lengthwise extending slot.

All the interlocks therefore comprise essentially tongue and groove formations having shoulders or abutting surfaces to withstand lateral stress but permitting relative longitudinal movement between the parts for assembling and dismantling operations. In assembling the yokes of the pressure distributing frame, the secondary yokes are engaged with the opposite ends of the primary yoke, this being facilitated by providing the headed studs 10 on the terminals of the primary yoke and the T-slots 11 in the intermediate portions of the secondary yokes, as illustrated to the left in Fig. 6. Thereafter, the seats 9 are brought into alinement with the tongues 6 and then by moving the secondary yokes toward each other, as from the dot and dash showings in Fig. 4 to the solid line position, the shanks of the headed studs will be engaged in the longitudinally extending portions of the slots 11 and the tongues 6 will be engaged in the seats 9 concurrently.

To maintain the several interlocks the secondary yokes are locked to the wiper against relative lengthwise movement. Herein, this is accomplished by a pair of spring detents 17 in the form of headed pins inverted to have their heads resting upon the resilient rubber wiper body 4 and their shanks protruding upwardly from holes in the flexible backing 5. These parts are so designed that the detent will recede as the tongues 6 slide into their seats and until a recess 16 in the secondary yoke is brought into registry with the detent whereupon the detent will be projected to engage in the recess and lock the secondary yoke against lengthwise movement on the wiper body. The T-slots 11 extend in opposite directions and when the secondary yokes are so locked against movement on the wiper body, the shanks of the headed studs 10 will be positioned within the narrow longitudinal portions of the slots with sufficient play to enable proper conformance of the wiping edge to the windshield surface. Therefore the detents also serve to secure the interlocks between the primary and secondary yokes. The T-slots, as well as the headed studs, may be formed in stamping operations, as when the channeled shape is imparted to each yoke. Likewise, the cooperating parts 6 and 9 of the interlocks between the secondaries and the flexible backing are formed by press operations. The headed studs enable a more complete nesting of the secondary yokes in the channeled primary yoke to reduce the overall distance between the outer end of the arm and the wiping edge of the blade for better wiping performance on either flat or curved surfaces.

Normalizing means are provided to maintain the wiping squeegee body in and to restore it to an upright position on the windshield glass during periods of inactivity, such normalizing means being in the form of a flat spring 14 interposed between each stud head and its overlying secondary yoke. With the arm attaching clip 7' rigid on the primary yoke, the normalizing means are located closer to the wiping body. These normalizing springs may be U-shaped for straddling the shanks of the headed studs and when in position, will be retained in place by ribs or detents 15 engaging in the entrance portions of the T-slots.

The foregoing description has been given in detail for clarity and not by way of limitation since the inventive principles involved are capable of assuming other physical embodiments without departing from the spirit of the invention and the scope of the appended claims.

What is claimed is:

1. A windshield wiper comprising an elongate body, an elongate primary yoke having arm attaching means, secondary yokes one for each end of the primary yoke, the intermediate portion of each secondary yoke and the respective end of the primary yoke having cooperating headed and recessed parts interengageable by and upon relative movement between the secondary yokes, and means securing each secondary yoke to the body and acting through the latter to hold the secondary yokes from a displacing reverse relative movement for maintaining the interlock operative.

2. A windshield wiper comprising an elongate body, an elongate primary yoke, secondary yokes one for each end of the primary yoke and each having a medial coupling part slidably engaged with a cooperating part on a respective end of the primary yoke by and upon relative movement between the secondary yokes in a direction lengthwise of the primary yoke, means slidably interlocking the opposite ends of the secondary yokes to the body, and means securing the secondary yokes from sliding on the body to secure the engagement of the primary yoke with the secondary yokes.

3. A windshield wiper comprising an elongate body, an elongate primary yoke having terminal heads, secondary yokes having medial recesses each detachably interlocked with a respective terminal head of the primary yoke and detachable therefrom by and upon relative movement therebetween lengthwise of the primary yoke, the secondary yokes being moved relatively in opposite directions, means detachably interlocking the opposite ends of the secondary yokes to the body by sliding the latter relative to the secondary yokes, and means securing the secondary yokes to the body against such relative movement to secure the second interlock and thereby hold the secondary yokes against relative movement for securing the first interlock.

4. A windshield wiper comprising an elongate body, an elongate primary yoke, secondary yokes each detachably interlocked with a respective end of the primary yoke and detachable therefrom by and upon relative movement therebetween lengthwise of the primary yoke, the secondary yokes being moved toward each other in effecting the interlocks, means slidably connecting the opposite ends of the secondary yokes to the body upon relative movement lengthwise of the body, and means securing the secondary yokes to the body from sliding thereby to hold the secondary yokes so interlocked with the primary yoke.

5. A windshield wiper comprising an elongate body, a primary yoke having means for attaching the wiper to an actuating arm, headed studs on the opposite ends of the yoke, secondary yokes each having a slot medially with an entranceway for receiving the respective headed stud to interlock the secondary yoke to an end of the primary yoke, by and upon relative movement therebetween lengthwise of the body, means connecting the opposite ends of the secondary yokes to the body to prevent relative lengthwise movement, and spring means engaged with the headed studs and reacting between the stud heads and the secondary yokes yieldably to hold the body in a position normal to the surface being wiped.

6. A windshield wiper comprising a primary yoke having terminal heads and a medial rigid means for attachment to an actuating arm, a pair of secondary yokes one for each end of the primary yoke, each secondary yoke having a medial recess pivotally receiving a respective terminal head for lateral rocking, an elongate body connected to the opposite ends of the secondary yokes, and a body normalizing spring engaging between each terminal head and its secondary yoke for yieldably holding the body in a normal intermediate position.

7. A windshield wiper comprising an elongate body, an elongate primary yoke having terminal heads, secondary yokes having medial recesses each detachably interlocked with a respective terminal head of the primary yoke by a sliding movement lengthwise of the primary yoke, the secondary yokes detachable from the primary yoke by sliding them in relatively opposite directions, and means connecting the opposite ends of the secondary yokes to the body to hold the secondary yokes against such relative movement in opposite directions and thereby to secure the interlocks.

JOHN R. OISHEI.

References Cited in the file of this patent

UNITED STATES PATENTS

| Number | Name | Date |
| --- | --- | --- |
| 1,920,730 | Wiseman | Aug. 1, 1933 |
| 1,953,635 | Rose | Apr. 3, 1934 |
| 2,264,167 | Paulus | Nov. 25, 1941 |
| 2,276,556 | Zaiger | Mar. 17, 1942 |

FOREIGN PATENTS

| Number | Country | Date |
| --- | --- | --- |
| 433,467 | Great Britain | Aug. 15, 1935 |

OTHER REFERENCES

Anderson Publication, Anderson Co., Gary, Ind., pages 2-3. November 1, 1946. (A copy in Div. 27.)